(12) United States Patent
Chung et al.

(10) Patent No.: US 9,321,904 B2
(45) Date of Patent: Apr. 26, 2016

(54) POLYAMIDE RESIN COMPOSITIONS AND ARTICLES INCLUDING THE SAME

(71) Applicant: Cheil Industries Inc., Gumi-si (KR)

(72) Inventors: Jae-Youp Chung, Uiwang-si (KR); Jung-Hun Lee, Uiwang-si (KR); Do-Hoon Chang, Uiwang-si (KR); Chang-Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/136,072

(22) Filed: Dec. 20, 2013

(65) Prior Publication Data

US 2014/0187703 A1    Jul. 3, 2014

(30) Foreign Application Priority Data

Dec. 28, 2012  (KR) .................. 10-2012-0157581

(51) Int. Cl.
| | | |
|---|---|---|
| C08K 3/40 | (2006.01) | |
| C08L 77/06 | (2006.01) | |
| C08K 7/14 | (2006.01) | |
| C08K 3/16 | (2006.01) | |

(52) U.S. Cl.
CPC ... C08K 7/14 (2013.01); C08K 3/16 (2013.01); C08L 77/06 (2013.01); C08L 2201/08 (2013.01)

(58) Field of Classification Search
USPC .................. 524/261, 262, 494, 602
See application file for complete search history.

(56) References Cited

U.S. PATENT DOCUMENTS

| | | | |
|---|---|---|---|
| 5,763,561 | A | 6/1998 | Keske |
| 5,962,628 | A | 10/1999 | Keske |
| 5,965,653 | A * | 10/1999 | Nishikawa et al. ........... 524/424 |
| 7,927,710 | B2 | 4/2011 | Hewel |
| 8,114,941 | B2 | 2/2012 | Kim et al. |
| 2003/0050376 | A1 * | 3/2003 | Oka et al. .................. 524/413 |
| 2009/0098325 | A1 | 4/2009 | Uchida et al. |
| 2011/0015328 | A1 | 1/2011 | Orihashi |
| 2012/0029133 | A1 * | 2/2012 | Stoppelmann et al. ....... 524/442 |
| 2012/0329944 | A1 | 12/2012 | Briffaud et al. |
| 2014/0002311 | A1 * | 1/2014 | Takano et al. .......... 343/700 MS |

FOREIGN PATENT DOCUMENTS

| | | |
|---|---|---|
| CN | 101298517 | 11/2008 |
| CN | 100491443 C | 5/2009 |
| CN | 102344672 | 2/2012 |
| EP | 0827976 A2 | 3/1998 |
| EP | 0861871 A1 | 9/1998 |
| EP | 1988113 A1 | 11/2008 |
| JP | 07-267689 A | 10/1995 |
| JP | 2007-277391 A | 10/2007 |
| JP | 2009-035591 | 2/2009 |
| JP | 2009035591 A * | 2/2009 |
| JP | 2012-092325 A | 5/2012 |
| KR | 10-1994-0014657 A | 7/1994 |
| KR | 10-2007-0119646 A | 12/2007 |
| KR | 10-2009-0062763 A | 6/2009 |
| KR | 10-2011-0077404 A | 7/2011 |
| KR | 10-2012-0037487 | 4/2012 |
| KR | 10-2012-0086344 | 9/2014 |

OTHER PUBLICATIONS

Extended European Search Report in counterpart European Application No. 13199382.6 dated Mar. 27, 2014, pp. 1-7.
Search Report in counterpart Chinese Application No. 201310746816.4 dated Oct. 12, 2015, pp. 1-4.

* cited by examiner

*Primary Examiner* — Tae H Yoon
(74) *Attorney, Agent, or Firm* — Additon, Higgins & Pendleton, P.A.

(57) ABSTRACT

A polyamide resin composition includes (A) a semi-aromatic polyamide resin including a dicarboxylic acid unit including about 40 to about 100 mol % of an aromatic dicarboxylic acid unit, and an aliphatic diamine unit; (B) a glass fiber, and optionally (C) a heat stabilizer including copper halide and/or alkali metal halide, where a content of a terminal carboxyl group [COOH] and a content of a terminal amino group [$NH_2$] of a molecular chain in the semi-aromatic polyamide resin (A) satisfy the following conditions:
[COOH]>37 µeq/g;
[$NH_2$]>80 µeq/g; and,
[$NH_2$]/[COOH]>1.

13 Claims, No Drawings

POLYAMIDE RESIN COMPOSITIONS AND ARTICLES INCLUDING THE SAME

CROSS-REFERENCE TO RELATED APPLICATION

This application claims priority to and the benefit of Korean Patent Application No. 10-2012-0157581 filed in the Korean Intellectual Property Office on Dec. 28, 2012, the entire disclosure of which is incorporated herein by reference.

FIELD OF THE INVENTION

A polyamide resin composition and articles including the same are disclosed.

BACKGROUND OF THE INVENTION

High heat resistant polyamide resin composition can be used for vehicle components and generally includes a semi-aromatic polyamide resin. Polyamide resin compositions used for a vehicle under the hood (UTH) components in an engine and the like should maintain excellent heat resistance (including long-term heat resistance), have chemical resistance for gasoline, engine oil, a calcium chloride aqueous solution, an LLC aqueous solution (cooling water), and the like, and maintain excellent mechanical properties such as hardness and strength. However, the long-term heat resistance and LLC resistance characteristics of polyamide resin compositions can be difficult to improve up to a satisfactory level, even if a glass fiber and optionally a heat stabilizer are added to the polyamide resin composition.

SUMMARY OF THE INVENTION

One embodiment of the present invention provides a semi-aromatic polyamide resin composition capable of providing articles that can have excellent mechanical properties as well as improved long-term heat resistance characteristics.

Another embodiment of the present invention provides an article including the semi-aromatic polyamide resin composition.

One embodiment of the present invention provides a polyamide resin composition that includes (A) a semi-aromatic polyamide resin including a dicarboxylic acid unit including about 40 to about 100 mol % of an aromatic dicarboxylic acid unit, and an aliphatic diamine unit; and (B) a glass fiber, where a content of a terminal carboxyl group [COOH] and a content of a terminal amino group [$NH_2$] of a molecular chain in the semi-aromatic polyamide resin (A) satisfy the following conditions:

[COOH]>37 µeq/g;
[$NH_2$]>80 µeq/g; and,
[$NH_2$]/[COOH]>1.

Another embodiment of the present invention provides a semi-aromatic polyamide resin composition that includes (A) a semi-aromatic polyamide resin including a dicarboxylic acid unit including about 40 to about 100 mol % of an aromatic dicarboxylic acid unit, and an aliphatic diamine unit; (B) a glass fiber; and (C) a heat stabilizer including copper halide and/or alkali metal halide, wherein a content of a terminal carboxyl group [COOH] and a content of a terminal amino group [$NH_2$] of a molecular chain in the semi-aromatic polyamide resin satisfy the following conditions:

[COOH]>37 µeq/g;
[$NH_2$]>100 µeq/g; and,
[$NH_2$]/[COOH]>1.

In the semi-aromatic polyamide resin composition, the content of the terminal carboxyl group [COOH] and the content of the terminal amino group [$NH_2$] may satisfy the following conditions:

[$NH_2$]>200 µeq/g; and,
[$NH_2$]/[COOH]>1.5.

The glass fiber (B) may include a binder, and the amount of the binder may be greater than or equal to about 0.50 wt % based on the total weight of a binder-containing glass fiber.

Yet another embodiment of the present invention provides an article including the polyamide resin composition.

An article manufactured from the polyamide resin compositions according to embodiments of the present invention can have chemical resistance such as LLC resistance as well as improved long-term heat resistance characteristics, and improved mechanical properties such as strength and elasticity, and may be applicable for use in various components, such as a material for vehicle UTH components.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

A semi-aromatic polyamide resin composition according to one embodiment of the present invention includes (A) a semi-aromatic polyamide resin including a dicarboxylic acid unit including about 40 to about 100 mol % of an aromatic dicarboxylic acid unit, and an aliphatic diamine unit; and (B) a glass fiber, where a content (amount) of a terminal carboxyl group [COOH] and a content (amount) of a terminal amino group [$NH_2$] of a molecular chain in the semi-aromatic polyamide resin (A) satisfy the following conditions:

[COOH]>37 µeq/g;
[$NH_2$]>80 µeq/g; and,
[$NH_2$]/[COOH]>1.

The glass fiber (B) may include a binder, and the amount of the binder may be greater than or equal to about 0.50 wt % based on the total weight of a binder-containing glass fiber.

(A) Semi-Aromatic Polyamide Resin

The semi-aromatic polyamide resin comprises a dicarboxylic acid unit and an aliphatic diamine unit.

The dicarboxylic acid unit includes about 40 to about 100 mol % of a unit derived from an aromatic dicarboxylic acid (also referred to herein as an aromatic dicarboxylic acid unit), wherein the amount of the aromatic dicarboxylic acid unit is based on the total mol % of the dicarboxylic acid unit.

In some embodiments, the dicarboxylic acid unit may include the aromatic dicarboxylic acid unit in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of the aromatic dicarboxylic acid unit can be in a range from about any of the foregoing amounts to about any other of the foregoing amounts.

The aliphatic diamine unit includes a unit derived from an aliphatic diamine, which can be an alkylene diamine and/or an alicyclic diamine (also referred to herein as an alkylene and/or alicyclic diamine unit).

The aliphatic diamine unit may be derived from C4 to C18 alkylene diamine and/or C5 to C18 alicyclic diamine. Examples of the C4 to C18 alkylene diamine may include without limitation linear alkylene diamines, such as 1,6-hexane diamine, 1,7-heptane diamine, 1,8-octane diamine, 1,9-nonane diamine, 1,10-decane diamine, 1,11-undecane diamine, 1,12-dodecane diamine, and the like; branched alkylene diamines such as 1-butyl-1,2-ethane diamine, 1,1-dimethyl-1,4-butane diamine, 1-ethyl-1,4-butane diamine, 1,2-dimethyl-1,4-butane diamine, 1,3-dimethyl-1,4-butane diamine, 1,4-dimethyl-1,4-butane diamine, 2,3-dimethyl-1,4-butane diamine, 2-methyl-1,5-pentane diamine, 3-methyl-1,5-pentane diamine, 2,5-dimethyl-1,6-hexane diamine, 2,4-dimethyl-1,6-hexane diamine, 3,3-dimethyl-1,6-hexane diamine, 2,2-dimethyl-1,6-hexane diamine, 2,2,4-trimethyl-1,6-hexane diamine, 2,4,4-trimethyl-1,6-hexane diamine, 2,4-diethyl-1,6-hexane diamine, 2,2-diethyl-1,7-heptane diamine, 2,3-dimethyl-1,7-heptane diamine, 2,4-dimethyl-1,7-heptane diamine, 2,5-dimethyl-1,7-heptane diamine, 2-methyl-1,8-octane diamine, 3-methyl-1,8-octane diamine, 4-methyl-1,8-octane diamine, 1,3-dimethyl-1,8-octane diamine, 1,4-dimethyl-1,8-octane diamine, 2,4-dimethyl-1,8-octane diamine, 3,4-dimethyl-1,8-octane diamine, 4,5-dimethyl-1,8-octane diamine, 2,2-dimethyl-1,8-octane diamine, 3,3-dimethyl-1,8-octane diamine, 4,4-dimethyl-1,8-octane diamine, 5-methyl-1,9-nonane diamine, and the like, and combinations thereof. Examples of C5 to C18 alicyclic damine may include, but are not limited to, cyclohexane diamine, methylcyclohexane diamine, isophorone diamine, norbornene diamine, and a combination thereof In exemplary embodiments, the aliphatic diamine unit may be derived from one or more diamines selected from 1,6-hexane diamine, 1,7-heptane diamine, 1,10-decane diamine, 1,11-undecane diamine, 1,12-dodecane diamine, 1-butyl-1,2-ethane diamine, 1,1-dimethyl-1,4-butane diamine, 1-ethyl-1,4-butane diamine, 1,2-dimethyl-1,4-butane diamine, 1,3-dimethyl-1,4-butane diamine, 1,4-dimethyl-1,4-butane diamine, 2,3-dimethyl-1,4-butane diamine, 2-methyl-1,5-pentane diamine, 3-methyl-1,5-pentane diamine, 2,5-dimethyl-1,6-hexane diamine, 2,4-dimethyl-1,6-hexane diamine, 3,3-dimethyl-1,6-hexane diamine, 2,2-dimethyl-1,6-hexane diamine, 2,2,4-trimethyl-1,6-hexane diamine, 2,4,4-trimethyl-1,6-hexane diamine, 2,4-diethyl-1,6-hexane diamine, 2,2-diethyl-1,7-heptane diamine, 2,3-dimethyl-1,7-heptane diamine, 2,4-dimethyl-1,7-heptane diamine, and/or 2,5-dimethyl-1,7-heptane diamine.

Examples of the aromatic dicarboxylic acid from which the aromatic dicarboxylic acid unit of the semi-aromatic polyamide resin may be derived include without limitation terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like, and combinations thereof.

The dicarboxylic acid unit of the semi-aromatic polyamide resin may further include a non-aromatic dicarboxylic acid unit derived from an aliphatic dicarboxylic acid. The aliphatic dicarboxylic acid can include a C4 to C18 alkylene dicarboxylic acid and/or a C5 to C18 alicyclic dicarboxylic acid. Examples of the alkylene dicarboxylic acid include without limitation malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, suberic acid, and the like, and combinations thereof. Examples of the alicyclic dicarboxylic acid include without limitation 1,3-cyclopentanedicarboxylic acid, 1,4-cyclohexanedicarboxylic acid, and the like, and combinations thereof. Such a non-aromatic dicarboxylic acid unit may be used singularly or in a combination of two or more.

The dicarboxylic acid unit may include the non-aromatic dicarboxylic acid unit in an amount of less than or equal to about 60 mol %, for example less than or equal to about 50 mol %, as another example less than or equal to about 30 mol %, and as another example less than or equal to about 10 mol %. In some embodiments, the dicarboxylic acid unit may include the non-aromatic dicarboxylic acid unit in an amount of 0 (the non-aromatic dicarboxylic acid unit is not present), about 0 (the non-aromatic dicarboxylic acid unit is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 mol %. Further, according to some embodiments of the present invention, the amount of the non-aromatic dicarboxylic acid unit can be in a range from about any of the foregoing amounts to about any other of the foregoing amounts.

Examples of the semi-aromatic polyamide resin may include without limitation a condensed polymer (e.g., nylon 6T) of terephthalic acid and C4 to C18 aliphatic diamine (e.g., hexamethylene diamine), a condensed polymer (e.g., nylon 6T/6I) of terephthalic acid, isophthalic acid, and C4 to C18 aliphatic diamine (e.g., hexamethylene diamine), a condensed polymer (e.g., nylon 6T/6I/66) of adipic acid, isophthalic acid and terephthalic acid, and C4 to C18 aliphatic diamine (e.g., hexamethylene diamine), or a combination thereof.

The polyamide resin composition satisfy the following relationship when a content (amount) of the terminal carboxyl group and a content (amount) of terminal amino group of the molecular chain of the semi-aromatic polyamide resin, referred to as [COOH] and [NH$_2$], respectively, are as follows:

[COOH]>37 µeq/g;
[NH$_2$]>80 µeq/g; and,
[NH$_2$]/[COOH]>1.

The content of the terminal amino group and the content of the terminal carboxyl group may be obtained by measuring an amine group concentration (amine concentration) and a carboxyl group concentration (acid concentration) of the polyamide resin prepared by using 0.1N-HC and 0.1N-KOH with a potential difference measuring equipment. (unit: µeq/g)

Articles manufactured from a high heat-resistance polyamide resin composition used in vehicle components have high elasticity coefficient and tensile strength and flexural strength. A polyamide resin for UTH of vehicle components may include a glass fiber and optionally a heat stabilizer so as to have LLC resistance characteristics and long-term heat resistance characteristics, but it is hard to obtain desirable LLC resistance characteristics and long-term heat resistance characteristics. Particularly, increased amounts of heat stabilizer can affect mechanical properties of articles, may be environmentally unfavorable, and may increase cost.

In the composition according to one embodiment of the present invention, the amounts of a terminal amino group and a terminal carboxyl group of the semi-aromatic polyamide resin as a base resin are controlled within predetermined ranges and ratios therebetween are controlled to be greater than the predetermined value, and thereby the composition can have a flexural modulus of greater than or equal to about 100,000 kgf/cm², flexural strength of greater than or equal to about 2,900 kgf/cm², and tensile strength of greater than or equal to about 2,000 kgf/cm² and improved LLC resistance characteristics, and has the potential to be a substitute for a metal as a material for UTH, when a binder-containing glass fiber, which is described herein, is used together with the semi-aromatic polyamide resin. For example, the composition can have a high level of long-term heat resistance even with a low amount of a heat stabilizer as also described herein.

The content of the terminal carboxyl group of the semi-aromatic polyamide resin may be greater than about 37 μeq/g, for example greater than or equal to about 40 μeq/g. The content of the terminal amino group of the semi-aromatic polyamide resin may be greater than about 80 μeq/g, for example greater than or equal to about 100 μeq/g, and as another example greater than or equal to about 150 μeq/g. A ratio [NH$_2$]/[COOH] between the content of the terminal carboxyl group and the content of the terminal amino group may be greater than about 1, for example greater than or equal to about 1.5, and as another example greater than or equal to about 2.

When the semi-aromatic polyamide resin satisfies the above conditions, long-term heat resistance characteristics can be improved, and LLC resistance characteristics can be remarkably improved, when a binder-containing glass fiber is used. Without being bound to any specific theory, it is believed that the range of the content of the terminal carboxyl group can be controlled while increasing the content of the terminal amino group of polyamide resin (i.e., a base resin), and the relationship between the terminal groups can also be controlled, and thus binding force between the glass fiber and the base resin can be improved, and thereby the composition can exhibit high LLC resistance as well as a high level of mechanical properties.

The molecular weight of the semi-aromatic polyamide resin is not particularly limited, and it is possible to use any one having an intrinsic viscosity (IV) of greater than or equal to about 0.75 dL/g, for example about 0.75 to about 1.15 dL/g, without limitation. The melting point of the semi-aromatic polyamide resin is not particularly limited, and may be greater than or equal to about 270° C., for example about 300 to about 350° C., without limitation.

The semi-aromatic polyamide resin composition may include the semi-aromatic polyamide resin in an amount of about 30 to about 80 wt %, for example about 35 to about 70 wt %, based on the total weight of the semi-aromatic polyamide resin composition. In some embodiments, the semi-aromatic polyamide resin composition may include the semi-aromatic polyamide resin in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the semi-aromatic polyamide resin can be in a range from about any of the foregoing amounts to about any other of the foregoing amounts.

The above semi-aromatic polyamide resin may be synthesized using any well-known method or may be a commercially available product. Specific examples of the commercially available products include without limitation products of Solvay, Evonik Industries, and the like.

(B) Glass Fiber

The glass fiber (B) can be any generally-used glass fiber in a thermoplastic resin composition, and a binder may be attached at the surface of the glass fiber. The glass fiber (B) may include the binder in an amount of greater than or equal to about 0.50 wt %, for example about 0.50 to about 0.70 wt % based on the total weight of the binder-containing glass fiber.

The binder may be any coupling agent (or binder) commonly used for a glass fiber. Examples of the binder may include, but are not limited to, amine-based coupling agents, epoxy-based coupling agents, silane-based coupling agents such as vinyl silanes and/or amino silanes, titanium-based coupling agents, and the like, and combinations thereof.

The diameter of the glass fiber is not particularly limited, and may be for example, about 5 to about 15 μm. The length of the glass fiber is not particularly limited, and may be about 3 to about 12 mm.

The semi-aromatic polyamide resin composition may include the glass fiber in an amount of about 20 to about 70 wt %, for example about 30 to about 65 wt % based on the total weight of the composition. In some embodiments, the semi-aromatic polyamide resin composition may include the glass fiber in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the glass fiber can be in a range from about any of the foregoing amounts to about any other of the foregoing amounts.

When the semi-aromatic polyamide resin composition includes the glass fiber in an amount within the above range, mechanical properties such as flexural strength, flexural modulus, and tensile strength may be improved so as to provide a substitute for a metal material, while ensuring LLC resistance characteristics. Accordingly, the semi-aromatic polyamide resin composition may be usefully applied for a vehicle UTH material in or out of an engine room.

A semi-aromatic polyamide resin composition according to another embodiment of the present invention includes (A) a semi-aromatic polyamide resin including a dicarboxylic acid unit and an aliphatic diamine unit; (B) a glass fiber; and (C) a heat stabilizer including copper halide and/or alkali metal halide, wherein a content (amount) of a terminal carboxyl group [COOH] and a content (amount) of a terminal amino group [NH$_2$] of a molecular chain in the semi-aromatic polyamide resin satisfy the following conditions:

[COOH]>37 μeq/g;
[NH$_2$]>100 μeq/g; and,
[NH$_2$]/[COOH]>1.

The dicarboxylic acid unit includes about 40 to about 100 mol % of a unit derived from an aromatic dicarboxylic acid (also referred to herein as an aromatic dicarboxylic acid unit), wherein the amount of the aromatic dicarboxylic acid unit is based on the total mol % of the dicarboxylic acid unit.

In some embodiments, the dicarboxylic acid unit may include the aromatic dicarboxylic acid unit in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of the aromatic dicarboxylic acid unit can be in a range from about any of the foregoing amounts to about any other of the foregoing amounts.

The aliphatic diamine unit includes a unit derived from a C4 to C18 alkylene diamine, a C5 to C18 alicyclic diamine, or a combination thereof (also referred to herein as an alkylene and/or alicyclic diamine unit).

The glass fiber (B) may include a binder, and the amount of the binder may be greater than or equal to about 0.50 wt % and for example, about 0.50 to about 0.70 wt % based on the total weight of a binder-containing glass fiber.

The semi-aromatic polyamide resin (A) is the same as described above except that a content of the terminal amino group [NH$_2$] is greater than about 100 µeq/g and the upper limit of the amount of the semi-aromatic polyamide resin (A) is 79.9 wt %. In addition, the glass fiber (B) is the same as described above except that the upper limit of the amount of the glass fiber (B) is 69.9 wt %.

(C) Heat Stabilizer

The heat stabilizer may include without limitation copper halide and/or an alkali metal halide. Examples of the copper halide may include without limitation copper chloride (I), copper bromide (I), copper iodide (I), copper chloride (II), copper bromide (II), copper iodide (II), and the like, and combinations thereof. Examples of the alkali metal halide may include without limitation lithium chloride, lithium bromide, lithium iodide, sodium fluoride, sodium chloride, sodium bromide, sodium iodide, potassium fluoride, potassium chloride, potassium bromide, potassium iodide, and the like, and combinations thereof.

The semi-aromatic polyamide resin composition may include the copper halide in an amount of about 0.01 to about 0.15 wt % based on the total weight of the semi-aromatic polyamide resin composition. In some embodiments, the semi-aromatic polyamide resin composition may include the copper halide in an amount of about 0.01, 0.02, 0.03, 0.04, 0.05, 0.06, 0.07, 0.08, 0.09, 0.10, 0.11, 0.12, 0.13, 0.14, or 0.15 wt %. Further, according to some embodiments of the present invention, the amount of the copper halide can be in a range from about any of the foregoing amounts to about any other of the foregoing amounts.

The semi-aromatic polyamide resin composition may include the alkali metal halide in an amount of about 0.02 to about 0.4 wt %, based on the total weight of the semi-aromatic polyamide resin composition. In some embodiments, the semi-aromatic polyamide resin composition may include the alkali metal halide in an amount of about 0.02, 0.03, 0.04, 0.05, 0.06, 0.07, 0.08, 0.09, 0.1, 0.2, 0.3, or 0.4 wt %. Further, according to some embodiments of the present invention, the amount of the alkali metal halide can be in a range from about any of the foregoing amounts to about any other of the foregoing amounts.

The semi-aromatic polyamide resin composition may have long-term heat resistance characteristics even though the heat stabilizer is included in such a low amount. In exemplary embodiments, when the heat stabilizer (C) is present, the semi-aromatic polyamide resin composition may include the heat stabilizer (C) in an amount of about 0.1 to about 0.5 wt % based on the total weight of the semi-aromatic polyamide resin composition. In some embodiments, the semi-aromatic polyamide resin composition may include heat stabilizer (C) in an amount of about 0.1, 0.2, 0.3, 0.4, or 0.5 wt %. Further, according to some embodiments of the present invention, the amount of the heat stabilizer (C) can be in a range from about any of the foregoing amounts to about any other of the foregoing amounts.

The semi-aromatic polyamide resin composition according to embodiments of the present invention may include various additives that are well known in a thermoplastic resin composition, as needed. Such an additive may include, for example, a stabilizer, a flame retardant (for example, a bromide polymer, antimony oxide, metal oxide, metal hydroxide, a phosphorus acid compound, a phosphorus-containing polymer, a silicone compound and a nitrogen-containing compound); an UV absorber (for example, a benzophenone-based compound, a benzotriazole-based compound, a benzoic acid-based compound); an antistatic agent, a plasticizer, a lubricant, nucleating agent, an antifriction, a processing aid, a colorant (for example, a pigment or a dye), an anti-dripping agent, an impact resistance improving agent, various thermoplastic polymers except the semi-aromatic polyamide resin (A), and the like, and combinations thereof, without limitation.

EXAMPLES

Hereinafter, the present invention is described in more detail with reference to Examples and Comparative Examples. The following Examples and Comparative Examples are exemplary only, and the present disclosure is not limited thereto.

In the following Examples and Comparative Examples, each component used for preparing the semi-aromatic polyamide resin composition is as follows.

(A) Semi-Aromatic Polyamide Resin

A-1: PA6T (Evonik Industries, M1100) having a melting point of 310° C., a content of a terminal amino group [NH$_2$]=214 µeq/g, and a content of a terminal carboxyl group [COOH]=112 µeq/g.

A-2: PA6T (Solvay, A-1006) having a melting point of 310° C., a content of a terminal amino group [NH$_2$]=84 µeq/g, and a content of a terminal carboxyl group [COOH]=38 µeq/g.

A-3: PA6T (Evonik Industries, M1000) having a melting point of 310° C., a content of a terminal amino group [NH$_2$]=37 µeq/g, and a content of a terminal carboxyl group [COOH]=185 µeq/g.

A-4: PA6T having a melting point of 305° C., a content of a terminal amino group [NH$_2$]=47 µeq/g, and a content of a terminal carboxyl group [COOH]=175 µeq/g.

A-5: PA6T having a melting point of 304° C., a content of a terminal amino group [NH$_2$]=21 µeq/g, and a content of a terminal carboxyl group [COOH]=30 µeq/g.

(B) Glass Fiber

B-1: 983 having a binder content of 0.65 wt % and made by Owens Corning Inc.

B-2: 459 having a binder content of 0.55 wt % and made by Nittobo Inc.

B-3: T-262H having a binder content of 0.45 wt % and made by NEG Inc.

(C) Heat Stabilizer

A CuI/KI heat stabilizer, TP-H9008 (the content of CuI: 10 to 20 wt %, the content of KI: 80 to 90 wt %) made by Bruggemannt Chemical Inc.

(D) Lubricant and Nucleating Agent

Talc, UPN HS-T 0.5 made by Hayashi Kasei Co. as a nucleating agent and calcium stearate as a lubricant in a mixing ratio of 1:1.

Examples 1 to 7 and Comparative Examples 1 to 8

Each polyamide resin composition according to Examples 1 to 7 and Comparative Examples 1 to 8 is prepared by using the components and the compositions provided in the following Tables 1 and 2 (unit: wt %). Specifically, each component is put in a common mixer, and the mixture is extruded into a pellet by using a twin-screw extruder having L/D=35 and φ=45 mm.

(1) Flexural strength (FS) and flexural modulus (FM): ASTM D790, 2.8 mm/min.
(2) Tensile strength (TS): ASTM D638, 5 mm/min.
(3) LLC resistance (TS reference): the specimens are allowed to stand in a solution prepared by mixing 50% of

TABLE 1

|  | Example 1 | Example 2 | Example 3 | Example 4 | Example 5 | Example 6 | Example 7 |
|---|---|---|---|---|---|---|---|
| A-1 | 64.6 | 64.6 | — | — | 64.5 | 64.4 | 64.3 |
| A-2 | — | — | 64.6 | 64.6 | — | — | — |
| A-3 | — | — | — | — | — | — | — |
| A-4 | — | — | — | — | — | — | — |
| A-5 | — | — | — | — | — | — | — |
| B-1 | 35 | — | 35 | — | 35 | 35 | 35 |
| B-2 | — | 35 | — | 35 | — | — | — |
| B-3 | — | — | — | — | — | — | — |
| C | — | — | — | — | 0.1 | 0.2 | 0.3 |
| D | 0.4 | 0.4 | 0.4 | 0.4 | 0.4 | 0.4 | 0.4 |
| Flexural strength (kgf/cm$^2$) | 3,118 | 3,044 | 3,135 | 2,916 | 3,011 | 2,994 | 2,962 |
| Flexural modulus (kgf/cm$^2$) | 115,700 | 116,120 | 117,950 | 117,350 | 116,150 | 117,340 | 117,110 |
| Tensile strength (kgf/cm$^2$) | 2,281 | 2,264 | 2,282 | 2,255 | 2,155 | 2,116 | 2,074 |
| LLC resistance (%) | 68 | 64 | 61 | 58 | 82 | 85 | 87 |
| Long-term heat resistance (%) | 58.4 | 53.6 | 47.4 | 44.5 | 67.3 | 71.4 | 72.7 |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| A-1 | — | — | — | — | 64.6 | — | — | — |
| A-2 | 64.6 | — | — | — | — | — | — | 64.4 |
| A-3 | — | 64.6 | 64.6 | 64.6 | — | — | — | — |
| A-4 | — | — | — | — | — | 64.6 | — | — |
| A-5 | — | — | — | — | — | — | 64.6 | — |
| B-1 | — | 35 | — | — | — | 35 | 35 | 35 |
| B-2 | — | — | 35 | — | — | — | — | — |
| B-3 | 35 | — | — | 35 | 35 | — | — | — |
| C | — | — | — | — | — | — | — | 0.2 |
| D | 0.4 | 0.4 | 0.4 | 0.4 | 0.4 | 0.4 | 0.4 | 0.4 |
| Flexural strength (kgf/cm$^2$) | 2,948 | 3,120 | 3,088 | 2,978 | 3,002 | 3,014 | 2,996 | 3,004 |
| Flexural modulus (kgf/cm$^2$) | 119,500 | 116,475 | 116,657 | 118,154 | 118,842 | 117,450 | 118,114 | 117,745 |
| Tensile strength (kgf/cm$^2$) | 2,259 | 2,233 | 2,265 | 2,246 | 2,255 | 2,267 | 2,157 | 2,085 |
| LLC resistance (%) | 45 | 55 | 53 | 37 | 48 | 43 | 46 | 44 |
| Long-term heat resistance (%) | 29.5 | 25.0 | 22.7 | 19.6 | 33.4 | 26.1 | 14.9 | 72.0 |

Property Test

The pellets according to Examples 1 to 7 and Comparative Examples 1 to 8 are dried at 100° C. in a forced convection drying oven for 4 hours to prepare each specimen for property tests and application evaluation at 330° C. of an injection temperature by using an injection molding machine. These specimens are allowed to stand at 23° C. under relative humidity of 50% for 48 hours, and then their properties are measured according to the following ASTM standards. The results are provided in Table 1 and Table 2.

ethylene glycol and 50% of water at 130° C. for 500 hours, and tensile strength of the specimens is measured according to ASTM D 638 (5 mm/min) to obtain a property maintenance rate.

(4) Long-term heat resistance (TS reference): the specimens are aged at 220° C. for 800 hours, and their tensile strengths are measured according to ASTM D 638 (5 mm/min) to obtain a property maintenance rate.

As shown from the results of Table 1, the specimens formed of the polyamide resin compositions according to Examples 1 to 7 maintain high mechanical properties such as flexural strength, flexural modulus, and tensile strength, exhibit high LLC resistance and improved long-term heat resistance characteristics even though the amount of a heat stabilizer is not increased. The specimens prepared from the polyamide resin compositions (Comparative Examples 1 to 8) including the amount of a terminal amino group and a terminal carboxyl group of semi-aromatic polyamide resin outside of the range according to one embodiment of the present invention exhibit a sharp tensile strength decrease due to insufficient LLC resistance and after allowed to stand for 800 hours and deterioration of long-term heat resistance characteristics.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polyamide resin composition comprising:
   (A) about 30 to about 80 wt % of semi-aromatic polyamide resin comprising a dicarboxylic acid unit including about 40 to about 100 mol % of an aromatic dicarboxylic acid unit and an aliphatic diamine unit; and (B) about 20 to about 70 wt % of glass fiber further comprising a binder in an amount of 0.55 wt % to about 0.70 wt %, based on the total weight of a binder-containing glass fiber, wherein each of the amounts of (A) and (B) is based on the total weight of the resin composition,
   where a content of a terminal carboxyl group [COOH] and a content of a terminal amino group [$NH_2$] of a molecular chain in the semi-aromatic polyamide resin (A) satisfy the following conditions:
   [COOH]>37 µeq/g;
   [$NH_2$]>80 µeq/g; and,
   [$NH_2$]/[COOH]>1, and
   wherein the semi-aromatic polyamide resin comprises nylon 6T (a polymer of terephthalic acid and hexamethylene diamine).

2. The polyamide resin composition of claim 1, wherein the semi-aromatic polyamide resin satisfies the following condition:
   [$NH_2$]>200 µeq/g; and,
   [$NH_2$]/[COOH]>1.5.

3. The polyamide resin composition of claim 1, wherein the binder comprises an amine-based coupling agent, an epoxy-based coupling agent, a silane-based coupling agent, a titanium-based coupling agent, or a combination thereof.

4. A polyamide resin composition, comprising:
   (A) about 30 to about 79.9 wt % of a semi-aromatic polyamide resin comprising a dicarboxylic acid unit including about 40 to about 100 mol % of an aromatic dicarboxylic acid unit and an aliphatic diamine unit; (B) about 20 to about 69.9 wt % of glass fiber further comprising a binder in an amount of 0.55 wt % to about 0.70 wt %, based on the total weight of a binder-containing glass fiber; and (C) about 0.1 to about 0.5 wt % of a heat stabilizer comprising copper halide, alkali metal halide, or a combination thereof, wherein the amounts of (A), (B), and (C) are based on the total weight of the resin composition, and
   wherein a content of a terminal carboxyl group [COOH] and a content of a terminal amino group [$NH_2$] of a molecular chain in the semi-aromatic polyamide resin satisfy the following conditions:
   [COOH]>37 µeq/g;
   [$NH_2$]>100 µeq/g; and,
   [$NH_2$]/[COOH]>1, and
   wherein the semi-aromatic polyamide resin comprises nylon 6T (a polymer of terephthalic acid and hexamethylene diamine).

5. The polyamide resin composition of claim 4, wherein the semi-aromatic polyamide resin satisfies the following condition:
   [$NH_2$]>200 µeq/g; and,
   [$NH_2$]/[COOH]>1.5.

6. The polyamide resin composition of claim 4, wherein the binder comprises an amine-based coupling agent, an epoxy-based coupling agent, a silane-based coupling agent, a titanium-based coupling agent, or a combination thereof.

7. The polyamide resin composition of claim 4, wherein the copper halide comprises copper chloride(I), copper bromide (I), copper iodide(I), copper chloride(II), copper bromide(II), copper iodide(II), or a combination thereof, and the alkali metal halide comprises lithium chloride, lithium bromide, lithium iodide, sodium fluoride, sodium chloride, sodium bromide, sodium iodide, potassium fluoride, potassium chloride, potassium bromide, potassium iodide, or a combination thereof.

8. An article manufactured from the polyamide resin composition according to claim 1.

9. An article manufactured from the polyamide resin composition according to claim 4.

10. The polyamide resin composition of claim 1, wherein the content of a terminal carboxyl group [COOH] is greater than or equal to about 112 µeq/g.

11. The polyamide resin composition of claim 4, wherein the content of a terminal carboxyl group [COOH] is greater than or equal to about 112 µeq/g.

12. A polyamide resin composition comprising:
   (A) about 30 to about 80 wt % of semi-aromatic polyamide resin comprising a dicarboxylic acid unit including about 40 to about 100 mol % of an aromatic dicarboxylic acid unit and an aliphatic diamine unit; and (B) about 20 to about 70 wt % of glass fiber further comprising a binder in an amount of 0.55 wt % to about 0.70 wt %, based on the total weight of a binder-containing glass fiber, wherein each of the amounts of (A) and (B) is based on the total weight of the resin composition,
   where a content of a terminal carboxyl group [COOH] and a content of a terminal amino group [$NH_2$] of a molecular chain in the semi-aromatic polyamide resin (A) satisfy the following conditions:
   [COOH]>37 µeq/g;
   [$NH_2$]>80 µeq/g; and,
   [$NH_2$]/[COOH]>1, and
   wherein the semi-aromatic polyamide resin has a melting point of about 300° C. to about 350° C. and comprises nylon 6T (a polymer of terephthalic acid and hexamethylene diamine), nylon 6T/6I (a polymer of terephthalic acid, isophthalic acid, and hexamethylene diamine), nylon 6T/6I/66 (a polymer of adipic acid, terephthalic acid, and hexamethylene diamine), or a combination thereof.

13. A polyamide resin composition, comprising:
   (A) about 30 to about 79.9 wt % of a semi-aromatic polyamide resin comprising a dicarboxylic acid unit including about 40 to about 100 mol % of an aromatic dicarboxylic acid unit and an aliphatic diamine unit; (B) about 20 to about 69.9 wt % of glass fiber further comprising a binder in an amount of 0.55 wt % to about 0.70 wt %, based on the total weight of a binder-containing glass fiber; and (C) about 0.1 to about 0.5 wt % of a heat stabilizer comprising copper halide, alkali metal halide, or a combination thereof, wherein the amounts of (A), (B), and (C) are based on the total weight of the resin composition, and wherein a content of a terminal carboxyl group [COOH] and a content of a terminal amino group [NH$_2$] of a molecular chain in the semi-aromatic polyamide resin satisfy the following conditions:

[COOH]>37 µeq/g;

[NH$_2$]>100 µeq/g; and,

[NH$_2$]/[COOH]>1, and wherein the semi-aromatic polyamide resin has a melting point of about 300° C. to about 350° C. and comprises nylon 6T (a polymer of terephthalic acid and hexamethylene diamine), nylon 6T/6I (a polymer of terephthalic acid, isophthalic acid, and hexamethylene diamine), nylon 6T/6I/66 (a polymer of adipic acid, terephthalic acid, and hexamethylene diamine), or a combination thereof.

* * * * *